United States Patent [19]

Hughes

[11] Patent Number: 5,386,803
[45] Date of Patent: Feb. 7, 1995

[54] ANIMAL DROSS ABSORBENT AND METHOD

[75] Inventor: John Hughes, Arlington Hgts., Ill.

[73] Assignee: American Colloid Company, Arlington Heights, Ill.

[21] Appl. No.: 423,193

[22] Filed: Oct. 18, 1989

Related U.S. Application Data

[63] Continuation-in-part of Ser. No. 297,471, Jan. 13, 1989, Pat. No. 5,000,115.

[51] Int. Cl.⁶ .......................................... A01K 1/015
[52] U.S. Cl. ................................... 119/173; 119/171
[58] Field of Search ................... 119/1, 171, 172, 173

[56]           References Cited

U.S. PATENT DOCUMENTS

| | | | |
|---|---|---|---|
| 2,649,759 | 8/1953 | Gibbs | 119/1 |
| 3,286,691 | 11/1966 | McFadden . | |
| 3,765,371 | 10/1973 | Fisher . | |
| 4,009,684 | 3/1977 | Kliment et al. . | |
| 4,275,684 | 6/1981 | Kramer et al. . | |
| 4,315,761 | 2/1982 | Larrson et al. | 71/21 |
| 4,343,751 | 8/1982 | Kumar | 264/37 |
| 4,395,357 | 7/1983 | Kramer et al. | 252/428 |
| 4,409,925 | 10/1983 | Brundett et al. . | |
| 4,459,368 | 7/1984 | Jaffee et al. | 502/80 |
| 4,494,481 | 1/1985 | Rodriguez et al. . | |
| 4,494,482 | 1/1985 | Arnold . | |
| 4,506,628 | 3/1985 | Stockel . | |
| 4,532,890 | 8/1985 | Ohki et al. . | |
| 4,570,573 | 2/1986 | Lohman . | |
| 4,591,581 | 5/1986 | Crampton et al. | 502/407 |
| 4,638,763 | 1/1987 | Greenberg . | |
| 4,641,605 | 2/1987 | Gordon . | |
| 4,657,881 | 4/1987 | Crampton et al. | 502/80 |
| 4,671,208 | 6/1987 | Smith . | |
| 4,685,420 | 8/1987 | Stuart . | |
| 4,686,937 | 8/1987 | Rosenfeld . | |
| 4,844,010 | 7/1989 | Ducharme et al. . | |
| 5,062,383 | 11/1991 | Nelson . | |

FOREIGN PATENT DOCUMENTS

| | | |
|---|---|---|
| 0087001 | 8/1983 | European Pat. Off. . |
| 0242478 | 10/1987 | European Pat. Off. . |
| 0378421 | 7/1990 | European Pat. Off. . |
| 0424001 | 4/1991 | European Pat. Off. . |
| 3620447 | 12/1987 | Germany ............................ 119/173 |
| 58009626 | 7/1981 | Japan . |
| 119127 | 11/1984 | Japan .................................. 119/1 |
| 0094043 | 5/1985 | Japan ................................ 119/173 |
| 1119127 | 6/1986 | Japan . |
| 2239932 | 10/1987 | Japan ................................ 119/173 |
| 1191626 | 1/1988 | Japan . |
| 3044822 | 2/1988 | Japan .................................. 119/1 |
| 3044823 | 2/1988 | Japan ................................ 119/173 |
| 3185323 | 7/1988 | Japan ................................ 119/173 |
| 219323 | 9/1988 | Japan ................................ 119/171 |
| 219323 | 9/1988 | Japan ................................ 119/171 |

OTHER PUBLICATIONS

"Smectite Clay Minerals: Properties and Uses," by I. E. Odom (pp. 171–189).

Preprint from the 1977 Bureau of Mines Minerals Yearbook of the United States Department of the Interior, (List continued on next page.)

Primary Examiner—John G. Weiss
Attorney, Agent, or Firm—Marshall, O'Toole, Gerstein, Murray & Borun

[57]           ABSTRACT

A composition and method of absorbing animal dross. Discrete particles of a composition comprising a combination of bentonite clays, particularly about 1% to about 50% by weight sodium bentonite, and about 50% to abut 99% by weight Fuller's Earth, or calcium bentonite, absorbs animal dross and related liquids, and simultaneously agglomerate into a sufficiently large and stable mass when contacted with the animal dross, and, unexpectedly, the agglomerates readily disperse in water so that the agglomerates can be disposed of in water, such as by being flushed down a toilet, or disposed of through other household plumbing lines without clogging the plumbing lines. The agglomerates can be physically separated and removed from unwetted particles of the composition. Removing the wetted and agglomerated composition particles from the remaining unwetted composition reduces or eliminates offensive odors produced by dross-soaked particles.

26 Claims, 1 Drawing Sheet

OTHER PUBLICATIONS

Bureau of Mines. The chapter is entitled "Clays" by Sarkis G. Ampian (pp. 1–34).

Industrial Minerals Jul. 1988–"Bentonite Overcapacity in Need of Markets," by Mike O'Driscoll, Associate American Editor (pp. 43–67).

Copy of "Kitten Kaboodle" bag, published Jan. 1990 by Kolclay Products.

Excerpts from Rex W. Grimshaw, *The Chemistry and Physics of Clays*, 4th Ed. (1971).

Excerpt from *Cats Magazine*, Sep. 1989, Regarding EVERCLEAN ® Product.

Article: *Litter That's Less Work*, New York Times, Mar. 18, 1989, Regarding EVERCLEAN ® Product.

Excerpt from *Cats Magazine*, May, 1990: Advertisement for EVERCLEAN ® product.

Excerpt from *Cats Magazine*, Sep. 1990: Advertisement for EVERCLEAN ® product.

Excerpt from *Cats Magazine*, Aug. 1990, regarding EVERCLEAN ® product.

*Summary Report of Investigations Made by the Mine's Branch During the Calendar Year Ending Dec. 31, 1921*, Regarding Properties of Bentonite.

*Cats Magazine* Article on Edward Lowe, Stating That Use of Clay for Cat Litter Was Discovered by Lowe in 1947.

Excerpts from *Minerals Yearbook*, vol. 1, United States Department of the Interior, 1985, Showing Use of Montmorillonite Clays as Pet Waste Absorbents in 1984–85.

Excerpts from J. S. Ross, *Bentonite in Canada*, Department of Mines and Technical Surveys, Mines Branch, Ottowa, 1964. Discusses: Hygroscopic Nature of Bentonite and Its Affinity for Liquids (p. 15), Use of Bentonite for Absorbing Liquids in Animal Bedding (p. 23), Greater Dry Strength of Bentonite Along with Attapulgite, When Compared with Other Clays (p. 11).

Canada Department of Mines, Mines, Branch, Report: *Investigations of Mineral Resources and the Mining Industry*, 1930. Discusses: Absorptive and Adsorptive Properties of Bentonite (p. 13), Use of Bentonite as an Absorptive (p. 15).

*Canadian Minerals Yearbook*, 1980, pp. 65–68. Discusses Highly Sorptive Properties of Bentonite and Suitability for Use As Pet Litter.

*Canadian Minerals Yearbook*, 1985, pp. 11.1–11.2. Discusses Highly Sorptive Properties of Bentonite and Suitability for Use as Pet Litter.

Excerpts from *Minerals Yearbook*, vol. 1, United States Department of the Interior, 1987, Showing Use of Fuller's Earth as Pet Waste Absorbents (Table 18, p. 251).

Letter dated Jul. 4, 1986 from Robert W. Graul to John Hughes with enclosure of report prepared by Robert Beamish on May 23, 1986 entitled "A Feasability and Marketing Study of Sodium Montmorillonite Cat Litter".

Letter dated Aug. 20, 1986 from John Hughes to Robert W. Graul.

Condensed Transcript and Concordance prepared by M & M Court Reporting Service, Inc. of the Deposition of Glen Teague on Oct. 21, 1993 (p. 2 to p. 73).

Condensed Transcript and Concordance prepared by M & M Court Reporting Service, Inc. of the Depositon of Phillip Webb on Oct. 21, 1993 (p. 2 to p. 32).

Transcript prepared by M & M Court Reporting Service, Inc. of the Telephonic Deposition of Dorothy Webb on Dec. 9, 1993 (p. 1 to p. 18).

Special Paper 20 Bentonite in Oregon: Occurrences, Analyses, and Economic Potential Date: Apr. 28, 1989.

Declaration of Ronald P. Geitey Dated: May 17, 1993.

Affidavit of I. Edgar Odom, Ph.D. Dated: Apr. 8, 1994.

Canadian Trademark Registration for EVERCLEAN ®, stating that EVERCLEAN ® product has been sold in Canada under the EVERLCEAN ® name since at least Dec. 1988.

Copy of page from U.S. Trademark Report indicating first use in commerce date of Oct. 22, 1987 for EVERCLEAN ®.

Excerpts from Clay Minerals Yearbook, vol. 1, United States Department of the Interior, Bureau of Mines, 1988. Tables 16, 18, and 20 (pp. 265, 267, 271, respectively) Show Use of Bentonite and Fuller's Earth as Pet Waste Absorbents.

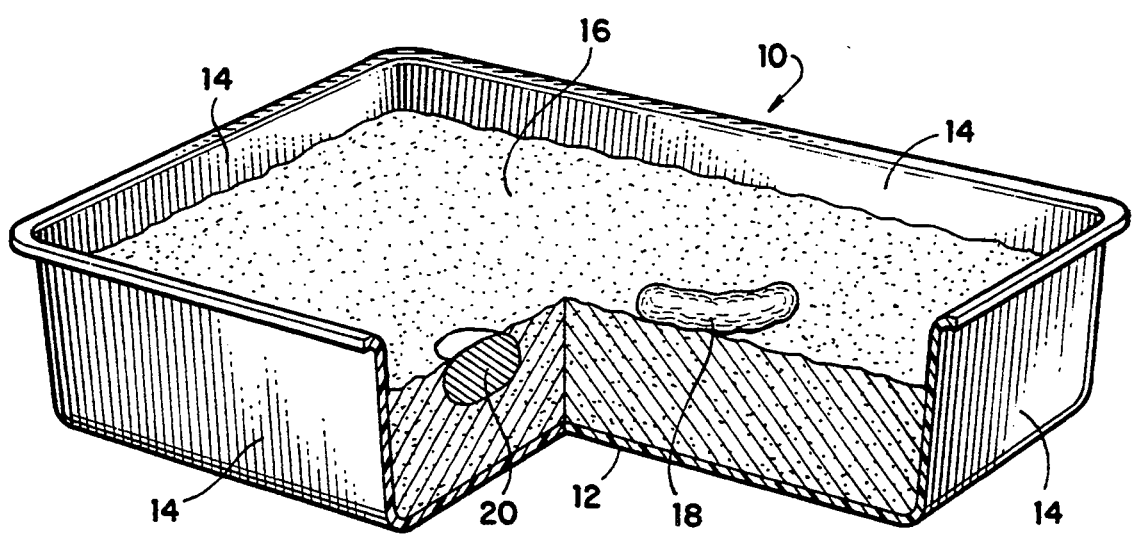

ANIMAL DROSS ABSORBENT AND METHOD

CROSS REFERENCE TO RELATED APPLICATION

This application is a continuation-in-part of copending application Ser. No. 297,471 filed Jan. 13, 1989 now U.S. Pat. No. 5,000,115.

FIELD OF THE INVENTION

The present invention relates to an absorbent composition for animal dross and its method of use. More particularly, the present invention relates to a composition comprising a combination of sodium bentonite, in an amount of about 1% to about 50% by weight, based on the total clay content, dry basis; and about 50% to about 99% calcium bentonite by weight, based on the total clay content, dry basis. Discrete particles of the combination of bentonite clays effectively absorb animal dross and simultaneously agglomerate into a sufficiently large and stable mass, such that the wetted mass of absorbent composition can be separated from unwetted particles of the composition and removed from a litter box. Further, the combination of sodium bentonite and calcium bentonite enables the dross-soaked agglomerates to readily and unexpectedly disperse in water so that the agglomerates can be dispersed in toilet water without mixing or other mechanical separation steps, or disposed of through a household plumbing line without clogging the toilet or other household plumbing lines. Consequently, odors emanating from the litter box are reduced or eliminated, and cost savings are achieved because the entire contents of the litter box, including both the soiled and the unsoiled absorbent composition, do not have to be discarded on a periodic basis. Further, the dross-soaked agglomerates can be sent to sewer lines through the toilet or household plumbing lines without the necessity of holding malodorous dross-soaked agglomerates for periodic garbage pick-ups.

BACKGROUND OF THE INVENTION AND PRIOR ART

House-broken animals, such as cats, are trained into the habit of urinating and defecating in a specially provided litter box. Similarly, untrained and caged animals, such as guinea pigs, urinate and defecate on the floor of their cage, often in approximately the same floor area of the cage. Consequently, pet owners, homeowners, veterinarians and laboratory personnel have added absorbent materials to the litter box or cage to collect the urine and feces. After a relatively short period of time, the dross-soiled absorbent emits objectionable odors because of the presence of the urine and fecal matter.

In order to reduce or eliminate these objectionable odors, homeowners periodically remove the fecal matter from the litter absorbent physically. However, physical removal of the feces does not reduce or eliminate odors caused by the urine absorbed into the absorbent. Therefore, when the odors caused by the absorbed urine become intolerable, the homeowner discards the litter box absorbent material entirely. The homeowner then washes the litter box and refills the litter box with fresh litter box absorbent material. These activities are unpleasant, time-consuming and expensive. Consequently, the litter box absorbent material usually is a relatively inexpensive solid absorbent material, such that discarding the complete litter box contents is not particularly economically burdensome. However, repeated litter box cleanings over a period of time accounts for relatively large expenditures.

The most commonly used litter box absorbent materials are inexpensive clays, such as calcined clays, that are safe and non-irritating to the animals, and that absorb relatively substantial amounts of liquids. Other porous, solid litter box absorbent materials, that are used alone or in combination, include straw, sawdust, wood chips, wood shavings, porous polymeric beads, shredded paper, sand, bark, cloth, ground corn husks, cellulose, and water-in-soluble inorganic salts, such as calcium sulfate. Each of these absorbent materials has the advantage of low cost, but each suffers from the disadvantage of merely absorbing a liquid waste product and holding the product within its porous matrices, or, in the case of sand, adsorbing the liquid dross on its surface. For each absorbent material, offensive odors are eventually caused by the absorbed urine, and the entire contents of the litter box, including soiled absorbent material and unsoiled absorbent material, has to be discarded.

One such litter box absorbent material is described in Lohman U.S. Pat. No. 4,570,573. The Lohman patent is directed to an animal litter composition comprising about 60-94% by weight paper, about 1-35% calcium sulfate and about 3-12% water. Such an absorbent is effective in collecting animal dross, but it does not reduce or eliminate the generation of objectionable odors and does not eliminate the disadvantage of periodically replacing the entire contents of the litter box. Larson et al in U.S. Pat. No. 4,315,761 describe the use of aerated or foaming concrete, of relatively large size, for example, to 10 mm (millimeters), to absorb animal dross and facilitate removal of the excrement from a litter box. The aerated concrete merely absorbs the animal dross, and therefore suffers from the identical drawback of present day animal litter box compounds, i.e., an inability to easily separate the soiled absorbent particles from the unsoiled absorbent particles without having to clear and clean the entire litter box.

Stuart, in U.S. Pat. No. 4,685,420, discloses an improved litter box absorbent composition comprising from 0.01% to 5.0% by weight of a water-absorbing polyacrylate in combination with a common litter box absorbent material. According to the method and composition of Stuart, the polyacrylate and absorbent material absorb the urine or similar waste material, and the polyacrylates act to gel the soiled litter box absorbent material into a gelled product. Stuart teaches that the gelled absorbent material then can be physically removed from the litter box to reduce the generation of offensive odors, and to avoid discarding the unsoiled portion of the absorbent material. However, the method and composition of Stuart suffers from the disadvantage of relative cost ineffectiveness. The commonly used litter box absorbent materials are very inexpensive materials, whereas the water-absorbent polymers of Stuart are relatively expensive products that can raise the initial cost of the litter box absorbent material to an unacceptable level in a very cost competitive market.

Other litter box absorbent materials are disclosed by Fisher in U.S. Pat. No. 3,765,371 describing a foamed plastic for absorbing and/or adsorbing animal dross; by Kramer et al in U.S. Pat. Nos. 4,275,684 and 4,395,357 describing calcium silicate as an animal litter box absorbent material and specifically teaching against the use of mineral products, such as clay-type minerals, because of the tendency of mineral products to swell upon liquid absorption; by Rodriguez et al in U.S. Pat. No. 4,494,481 describing the addition of a transition metal of Group Ib or IIb of the periodic table to present-day litter box absorbent materials to prevent the development of urine odors; and by Greenberg in U.S. Pat. No. 4,638,763 describing the addition of sodium sulfate to a litter box absorbent material to facilitate removal of soiled absorbent from the litter box.

Therefore, a need exists for a litter box absorbent material that effectively collects the urine or other dross material of house-broken pets and caged animals; that agglomerates when wetted to allow physical removal of the wetted litter box absorbent material from unwetted litter box absorbent material in order to reduce or eliminate dross-based odors and to reduce costs associated with animal litter box absorbent materials; that is capable of spontaneous dispersion in water after agglomeration so that the material can be discarded to a household waste or storm sewer line, for example, by flushing the dross-soaked, dispersed agglomerates down a household toilet, without clogging plumbing lines; and that is sufficiently economical for practical use in a highly competitive and cost conscious market. Surprisingly and unexpectedly, it has been found that a combination of sodium bentonite, in an amount of about 1% to about 50% by weight, and calcium bentonite in an amount of about 50% to about 99%, by weight, based on the total weight of clay in the composition, effectively absorbs animal dross; and during absorption of the animal dross, agglomerates into a sufficiently large and stable mass for physical separation of the soiled portion of the litter box absorbent material from the unused portion of the litter box absorbent material, such that the agglomerates readily and spontaneously disperse in water for disposal through a household sewer conduit. The combination of bentonite clays, and their absorbent and agglomerating properties, effectively reduce or eliminate odors associated with animal dross; reduce costs associated with litter box absorbent material replacement; and are sufficiently economical to compete effectively in a highly competitive and cost conscious industry.

SUMMARY OF THE INVENTION

In brief, the present invention is directed to a composition and method of absorbing and disposing of animal dross. The composition comprises discrete particles of a combination of water-swellable sodium bentonite clay and calcium bentonite clay that effectively absorbs animal dross and simultaneously agglomerates into a water-dispersible but physically stable mass, thereby permitting physical separation of the soiled and wetted bentonite clay particles from discrete particles of the unsoiled and unwetted water-swellable bentonite clay, and has sufficient water-dispersibility for disposal through a household plumbing or sewer conduit without clogging.

Therefore, it is an object of the present invention to provide an improved absorbent composition for animal waste products and related waste products.

Another object of the present invention is to provide a bentonite clay composition that effectively absorbs animal dross and simultaneously agglomerates into a water-dispersible mass of sufficient size and cohesive strength for physical removal from unwetted litter box bentonite clay absorbent composition.

Another object of the present invention is to provide a composition that eliminates or reduces odors associated with animal dross deposited in a litter box.

Another object of the present invention is to provide a composition that economically eliminates or reduces odors associated with animal dross deposited in a litter box.

Another object of the present invention is to provide a composition that facilitates and reduces cleaning and maintenance of animal litter boxes and animal cages.

Still another object of the present invention is to provide a composition that overcomes the disadvantages of prior art animal litter box absorbent compositions and that is economically competitive with prior art litter box absorbents.

Another object of the present invention is to provide a composition for absorbing animal dross such that the physical removal of urine from an animal litter box is possible.

Another object of the present invention is to provide an animal dross-absorbent composition capable of agglomeration upon contact with animal dross, particularly animal urine, such that the agglomerates are capable of easy and spontaneous dispersion in water for disposal through a household plumbing conduit.

Another object of the present invention is to provide a method of effectively absorbing animal dross with a composition comprising a combination of water-swellable sodium bentonite clay and calcium bentonite clay that simultaneously agglomerate into a sufficiently large mass of sufficient strength upon absorbing the animal dross to permit physical separation of soiled and wetted bentonite clay particles from the unsoiled and unwetted bentonite clay particles, such that the agglomerates are capable of being dispersed in water for periodic disposal through a household plumbing line without clogging.

The above and other objects and advantages of the present invention will become apparent from the following detailed description of the invention.

BRIEF DESCRIPTION OF THE DRAWING

FIG. 1 is a perspective view of a receptacle including the absorbent composition of the present invention.

DETAILED DESCRIPTION OF THE INVENTION

In accordance with the method and composition of the present invention, a combination of water-swellable sodium bentonite clay and calcium bentonite clay have been found useful as animal dross absorbents. The combination of bentonite clays of the present invention provide advantages over prior art animal litter box absorbent compositions in that the bentonite clays are capable of absorbing several times their weight in liquid dross material and also are capable of simultaneously agglomerating and dispersing in water to form a wetted mass of sufficient size and cohesive strength such that the soiled and wetted mass can be physically separated from the remaining unwetted water-swellable bentonite clay absorbent and later dispersed in water for disposal through a household plumbing conduit. These properties of the water-swellable bentonite clays serve to reduce or eliminate odors resulting from urine-saturated litter box absorbents; to reduce the cost of using a litter box absorbent material because only soiled absorbent material is discarded; to reduce the number of times the litter box or animal cage must be completely cleaned; and enable periodic disposal of the formed agglomerates through a household sewer conduit. Furthermore, the combination of bentonite clays of the present invention provide these cost saving and work saving benefits without adding expensive supplementary compounds, such as water-absorbent polymers, that can prohibitively increase the cost of a product competing in a very cost-conscious market.

In accordance with an important feature of the present invention, the combination of bentonite clays provide an improved animal litter box absorbent composition. The combination of sodium and calcium bentonite clays of the present invention absorb several times their own weight of an aqueous fluid, such as urine, and consequently swell. The wetted, swelled bentonite particles then interact with nearby wetted and swelled bentonite particles and agglomerate through physical and chemical interactions, such as hydrogen bonding and entanglement, to form a wetted mass of sufficient stability and size such that the mass can be removed from the unwetted particles of the bentonite clay combination. Unexpectedly, the agglomerates then spontaneously disperse when contacted with water, such as in a toilet bowl, for disposal into a waste or storm sewer. The chemical and physical interactions that cause the wetted bentonite clay particles to agglomerate and easily disperse in water are not present when the bentonite clay particles are dry, hence separation-of the wetted, swelled bentonite clay particles from the unwetted and unswelled bentonite clay particles is facilitated.

In practice, when an animal urinates on the litter box absorbent of the present invention, the urine is absorbed by the sodium and calcium bentonite clays to form an agglomerated mass of sodium and calcium bentonite clays and urine. This agglomerated mass has sufficient physical integrity to be removed from a litter box, or an animal cage, by using the implements and methods normally used to remove feces from a litter box. Therefore, the litter box absorbent composition of the present invention permits the animal owner or caretaker to employ the same removal techniques used to remove feces from the litter box to remove urine from the litter box. Before the method and composition of the present invention, it was not possible to mechanically remove urine from a litter box utilizing only a clay as the absorbent because the urine-soaked particles could not be differentiated from, and were not in the form of a sufficiently stable mass for separation from, the unsoiled absorbent in the litter box.

In accordance with an important feature of the present invention, the bentonite clay absorbent remaining in the litter box after removal of the urine-soaked and agglomerated bentonite clay still is available for future use. This portion of the litter box absorbent composition is still clean and useful, and does not contribute to the generation of noxious odors. In contrast, when using prior art litter box absorbents, such clean and useful absorbent material had to be discarded with the soiled absorbent material because no means existed to effectively separate the soiled absorbent from the fresh absorbent.

For example, FIG. 1 shows a litter box 10 comprising a water-impermeable floor member 12 having integral, water-impermeable upstanding walls 14. The unsoiled absorbent composition 16, comprising sodium bentonite clay in an amount of about 1% to about 50% based on the total dry clay weight in the absorbent composition, and calcium bentonite, in an amount of about 50% to about 99% based on the total dry clay weight in the absorbent composition is placed in the litter box 10. Solid animal dross 18, such as fecal matter, is of sufficient mass and of sufficient cohesive strength to be physically removed from the litter box for ultimate disposal. Liquid animal dross, such as urine, vomit or blood, contacts the absorbent, bentonite composition 16, causing the bentonite clays to agglomerate into a soiled solid mass 20 of sufficient size and sufficient cohesive strength to allow physical removal of the soiled solid mass 20 from the remaining unsoiled absorbent composition 16. Because the combination of sodium and calcium bentonites contained in the agglomerates unexpected disperse when contacted with water, the agglomerates can be disposed of down a household toilet or sink without clogging household plumbing conduits. The remaining unsoiled absorbent composition 16 does not contribute to the generation of noxious odors and can remain in litter box 10 for future use. Soiled solid mass 20 is discarded in an appropriate manner without the need of cleaning the entire litter box 10 and discarding its entire contents.

Therefore, and in accordance with another important feature of the present invention, the combination of bentonite clays provide a cost savings over the prior art litter box absorbents. First, cost savings are realized because unsoiled and unused absorbent composition is not discarded with the soiled absorbent composition. Secondly, and most surprisingly and unexpectedly, the water-swellable bentonite clays provide these cost-saving benefits without the addition of expensive polymeric compounds that force the absorbent particles to gel into a removable physical mass. Therefore, utilizing the combination of sodium and calcium bentonite clays of the present invention minimizes the raw material cost of the litter box absorbent composition in a cost competitive market.

The litter box absorbent composition of the present invention comprises a combination of sodium and calcium bentonite clays. The use of bentonite clays in a variety of applications, such as a component in drilling muds, is well known. Bentonites are economical, readily available clays, with certain forms capable of hydrating and swelling in the presence of water. The swelling properties of bentonite are related to the exchangeable cations present in a particular bentonite ore. The water-swellable bentonite clays contain various exchangeable cations, including sodium, potassium, lithium, ammonium, calcium and magnesium. The clays useful in combination in accordance with the principles of the present invention have sodium and calcium as the predominant exchangeable cation although these clays often include a variety of other exchangeable cations in a smaller amount. The remaining bentonite clays, containing predominantly other exchangable cations, can be added as well, so long as the sodium bentonite comprises about 1% to about 50% based on the total dry weight of bentonite clays in the composition and the calcium bentonite comprises about 50% to about 99% based upon the total dry weight of bentonite clays in the composition. The bentonite clays can be any member of the dioctahedral or trioctahedral smectite group, or a mixture thereof. Examples include Montmorillonite, Beidellite, Nontronite, Hectorite and Saponite; or combinations thereof.

In order to achieve the full advantage of the present invention, it is preferred that the sodium and calcium bentonite clays in the composition are not calcined. Calcination results a loss of a portion of the hydroxyl groups from the bentonite clay, and such hydroxyl groups are related to the water-absorption and water-swelling properties of the bentonite clay. Consequently, a calcined bentonite clay, while still able to absorb many times its weight of a liquid, may not swell and agglomerate with nearby wetted and calcined bentonite particles as effectively as uncalcined bentonite particles.

To achieve the full advantage of the present invention, the sodium and calcium bentonite clays in the litter box absorbent composition have a particle size ranging from about 50u (microns) to about 3350u in diameter, and preferably in a particle size ranging from about 600u to about 3350u in diameter; or, in other words, in a particle size of from about 6 mesh to about 100 mesh. It has been found that the sodium and calcium bentonite particles appreciably greater than about 3350u in diameter do not sufficiently cohesively agglomerate to allow facile physical separation of the wetted, agglomerated mass from the litter box. Furthermore, it has been found that sodium and calcium bentonite particles appreciably smaller than about 50u in diameter produce a litter box absorbent composition that is too dusty. To achieve the fullest advantage of the present invention, the sodium and calcium bentonite clays should be present in the composition in particle sizes across substantially the entire range of about 600u to about 3350u because the smaller diameter water-swellable bentonite particles, upon being wetted, swell and serve as "bridges" between larger, wetted bentonite particles. The overall effect is the production of a sufficiently large wetted mass with excellent physical cohesive strength that unexpectedly disperses in water for sewage disposal.

The litter box absorbent composition of the present invention can consist only of the sodium and calcium bentonite clays, thereby avoiding any extra compounding process steps. In addition, the litter box absorbent composition of the present invention optionally can include other bentonite clays, perfumes, deodorants, odor absorbents, antimicrobial agents, disinfectants, colorants and pesticides, in an amount sufficient to perform their intended function. The litter box absorbent composition also can include other typically used litter box absorbents such as other clays, sand, or cellulose-based materials. However, any optionally added ingredient cannot be present in an amount that materially and adversely affects the ability of the sodium and calcium bentonite clays to absorb liquid dross products and simultaneously agglomerate into a water-dispersible monolithic mass of sufficient size and cohesive strength for physical removal of the soiled and wetted mass from the litter box.

It should be noted that the animal dross absorbent of the present invention can be used in litter boxes or in cages of animals including, among others, household pets such as cats, dogs, gerbils, guinea pigs, mice and hamsters; other pets such as rabbits, ferrets and skunks; or laboratory animals such as monkeys, mice, rats, goats, horses, cows and sheep. The animal litter absorbent of the present invention is especially useful for smaller animals, such as cats. Furthermore, the combination of sodium and calcium bentonite clays of the present invention is suitable for other uses in addition to absorbing urine, such as absorbing vomit or absorbing waste liquids in appropriate areas of slaughter houses and meat packing plants.

To demonstrate the new and unexpected results of the present invention, 454 g. (one pound) of a combination of sodium bentonite and calcium bentonite clays of the present invention (25% by weight sodium bentonite and 75% by weight calcium bentonite) was placed in a plastic litter box. The litter box then was used in a house that included 2 cats as household pets. The cats urinated in the litter box at regular intervals, causing the bentonite clays of the present invention to agglomerate into sufficiently large and stable masses for at least daily physical removal, depending upon the quantity of urine and feces deposited in the litter box. The agglomerates are dropped onto the top of water contained in a household toilet and within 30 seconds or less completely disperse in the toilet water and are flushed to a sewer without plumbing clogging. The unsoiled bentonite clays were allowed to remain in the litter box for subsequent use, and it was found that the litter box was free of offending odors for 14 days. After this time, the litter box was recharged with more of the sodium and calcium bentonite clay composition of the present invention. At the user's option, the litter box can be completely cleaned, or an additional amount of the clay composition can be added to the small amount of remaining, unsoiled bentonite clays without cleaning the litter box because no offensive odors were being generated. In contrast, present day animal litter absorbents generate a sufficient amount of offensive odors such that the litter box must be cleaned at least weekly, and usually at least twice weekly.

Obviously, many modifications and variations of the invention as hereinbefore set forth can be made without departing from the spirit and scope thereof and therefore only such limitations should be imposed as are indicated by the appended claims.

What is claimed and sought to be secured by Letters Patent is:

1. An improved animal litter product comprising a combination of about 11% to about 50% by weight of sodium bentonite particles of a size ranging from about 50 microns to about 3350 microns and about 50% to about 89% by weight of calcium bentonite particles of a size ranging from about 50 microns to about 3350 microns, said product being characterized by the property that when contacted with urine at least one wetted agglomerated mass consisting of sodium bentonite, calcium bentonite and urine is formed which can be removed from the balance of the litter without disintegration.

2. An improved animal litter product comprising a combination of about 11% to about 50% by weight of sodium bentonite particles of a size ranging from about 50 microns to about 3350 microns and about 50% to about 89% by weight of calcium bentonite particles of a size ranging from about 50 microns to about 3350 microns, said product being characterized by the property that when contacted with urine at least one wetted agglomerated mass consisting essentially of sodium bentonite, calcium bentonite and urine is formed which can be removed from the balance of the litter without disintegration.

3. The improvement of claim 2 wherein said litter product is substantially free of a gel-forming polymeric compound.

4. The improvement of claim 2 wherein the size of said calcium bentonite particles ranges from about 600 microns to about 3350 microns.

5. The improvement of claim 2 wherein the size of said sodium bentonite particles ranges from about 600 microns to about 3350 microns.

6. The improvement of claim 2 wherein said sodium bentonite particles and said calcium bentonite particles have a size over the full range of 600 microns to 3350 microns.

7. The improvement of claim 2 wherein said sodium bentonite particles and said calcium bentonite particles include a size within the range of about 50 microns to about 600 microns.

8. The improvement of claim 2 wherein said litter product contains at least one optional component selected from the group consisting of perfumes, deodorants, odor absorbents, antimicrobial agents, disinfectants, colorants, pesticides, and bentonite clays other than sodium and calcium bentonite.

9. The improvement of claim 2 wherein said wetted agglomerated mass further contains at least one component selected from the group consisting of perfumes, deodorants, odor absorbents, antimicrobial agents, disinfectants, colorants, pesticides, and bentonite clays other than sodium and calcium bentonite.

10. The improvement of claim 2 wherein said wetted agglomerated mass, after removal from the balance of said litter, is characterized by the property of being dispersible in water for sewage disposal.

11. The litter product of claim 2 comprising a combination of about 25% by weight sodium bentonite and about 75% by weight calcium bentonite.

12. An improved animal litter product comprising a combination of about 10% to about 50% by weight of sodium bentonite particles of a size ranging from about 50 microns to about 3350 microns and about 50% to about 90% by weight of calcium bentonite particles of a size ranging from about 50 microns to about 3350 microns, said product being characterized by the property that when contacted with urine at least one wetted agglomerated mass comprising sodium bentonite, calcium bentonite and urine is formed which can be removed from the balance of the litter without disintegration.

13. The improved animal litter product of claim 12 wherein the sodium bentonite clay particles are present in an amount of about 10% to about 40% by weight, and the calcium bentonite clay particles are present in an amount of about 60% to about 90% by weight, based on the total dry weight of bentonite clays in the litter product.

14. The improved animal litter product of claim 12 wherein the sodium bentonite clay particles are present in an amount of about 10% to about 25% by weight, and the calcium bentonite clay particles are present in an amount of about 60% to about 75% by weight, based on the total dry weight of bentonite clays in the litter product.

15. The improved animal litter product of claim 12 wherein said litter product is substantially free of a gel-forming polymeric compound.

16. The improved animal litter product of claim 12 wherein the size of said calcium bentonite particles ranges from about 600 microns to about 3350 microns.

17. The improved animal litter product of claim 12 wherein the size of said sodium bentonite particles ranges from about 600 microns to about 3350 microns.

18. The improved animal litter product of claim 12 wherein said sodium bentonite particles and said calcium bentonite particles have a size over the full range of 600 microns to 3350 microns.

19. The improved animal litter product of claim 12 wherein said sodium bentonite particles and said calcium bentonite particles include particles having a size within the range of about 50 microns to about 600 microns.

20. The improved animal litter product of claim 12 wherein said litter product contains at least one optional component selected from the group consisting of: perfumes, deodorants, odor absorbents, antimicrobial agents, disinfectants, colorants, pesticides, and bentonite clays other than sodium and calcium bentonite.

21. The improved animal litter product of claim 12 wherein said wetted agglomerated mass further contains at least one component selected from the group consisting of: perfumes, deodorants, odor absorbents, antimicrobial agents, disinfectants, colorants, pesticides, and bentonite clays other than sodium and calcium bentonite.

22. The improved animal litter product of claim 12 wherein said wetted agglomerated mass, after removal from the balance of said litter, is characterized by the property of being dispersible in water for sewage disposal.

23. The improved animal litter product of claim 12 comprising a combination of about 25% by weight sodium bentonite and about 75% by weight calcium bentonite.

24. The improved animal litter product of claim 12 wherein the sodium and calcium bentonite clays are included in the litter product in an amount of at least 90% based on the dry weight of the litter product.

25. The improved animal litter product of claim 12 wherein the sodium and calcium bentonite clays are included in the litter product in an amount of at least 65% based on the dry weight of the litter product.

26. An improved animal litter product comprising a combination of about 10% to about 40% by weight of sodium bentonite particles of a size ranging from about 50 microns to about 3350 microns and about 60% to about 90% by weight of calcium bentonite particles of a size ranging from about 50 microns to about 3350 microns, said product being characterized by the property that when contacted with urine at least one wetted agglomerated mass consisting essentially of sodium bentonite, calcium bentonite and urine is formed which can be removed from the balance of the litter without disintegration.

* * * * *